(12) United States Patent
Gobara et al.

(10) Patent No.: US 9,716,545 B2
(45) Date of Patent: Jul. 25, 2017

(54) INTEGRATED CIRCUIT FOR SATELLITE SIGNAL RECEPTION

(71) Applicant: Seiko Epson Corporation, Tokyo (JP)

(72) Inventors: Naoki Gobara, Shiojiri (JP); Maho Terashima, Matsumoto (JP); Mikio Nagahara, Yamagata (JP); Hiroshi Uozumi, Matsumoto (JP)

(73) Assignee: Seiko Epson Corporation (JP)

(*) Notice: Subject to any disclaimer, the term of this patent is extended or adjusted under 35 U.S.C. 154(b) by 101 days.

(21) Appl. No.: 14/532,374

(22) Filed: Nov. 4, 2014

(65) Prior Publication Data

US 2015/0162976 A1    Jun. 11, 2015

(30) Foreign Application Priority Data

Dec. 5, 2013  (JP) ................................ 2013-251777

(51) Int. Cl.
H04B 7/185 (2006.01)
(52) U.S. Cl.
CPC ................... *H04B 7/18513* (2013.01)
(58) Field of Classification Search
CPC . G01S 19/235; H04M 3/42348; H04W 4/008; H04W 4/02; H04W 4/027
See application file for complete search history.

(56) References Cited

U.S. PATENT DOCUMENTS

| 3,701,894 | A | 10/1972 | Low et al. |
|---|---|---|---|
| 5,650,785 | A | 7/1997 | Rodal |
| 5,898,665 | A | 4/1999 | Sawahashi et al. |
| 5,949,812 | A | 9/1999 | Turney et al. |
| 6,154,487 | A | 11/2000 | Murai et al. |
| 6,377,683 | B1 | 4/2002 | Dobson et al. |
| 6,888,879 | B1 | 5/2005 | Lennen |
| 7,110,442 | B2 | 9/2006 | Lennen |
| 7,157,794 | B2 | 1/2007 | Mori |
| 7,545,036 | B2 | 6/2009 | Terui et al. |
| 8,634,504 | B2 | 1/2014 | Terashima et al. |
| 8,737,363 | B2 | 5/2014 | Ozluturk et al. |
| 8,755,472 | B2 | 6/2014 | Sun et al. |
| 2002/0150150 | A1 | 10/2002 | Kohli et al. |
| 2003/0081660 | A1 | 5/2003 | King et al. |
| 2003/0127704 | A1 | 7/2003 | Kobayashi et al. |
| 2003/0189251 | A1 | 10/2003 | Terui et al. |

(Continued)

FOREIGN PATENT DOCUMENTS

| JP | 2013-142607 A | 12/1976 |
|---|---|---|
| JP | 2001-042023 A | 2/2001 |

(Continued)

OTHER PUBLICATIONS

World's smallest and thinnest 0.15×0.15 mm, 7.5 micro meter thick RFID IC chip. Hitachi, Ltd Feb. 2006.*

(Continued)

*Primary Examiner* — David Oveissi
(74) *Attorney, Agent, or Firm* — Harness, Dickey & Pierce, P.L.C.

(57) ABSTRACT

An integrated circuit for satellite signal reception includes a position calculation part and has a volume of 9.33 mm$^3$ or less, and a time from measurement start to initial measurement of 120 seconds or less at a signal intensity of −162 dBm or more and −160 dBm or less.

4 Claims, 5 Drawing Sheets

(56) References Cited

U.S. PATENT DOCUMENTS

| | | |
|---|---|---|
| 2003/0205808 A1 | 11/2003 | Terui et al. |
| 2004/0202235 A1 | 10/2004 | Kohli et al. |
| 2006/0056497 A1 | 3/2006 | Lennen |
| 2006/0215740 A1 | 9/2006 | Teruuchi et al. |
| 2008/0001287 A1 | 1/2008 | Nakashiba |
| 2008/0101442 A1 | 5/2008 | Rasmussen |
| 2008/0151970 A1 | 6/2008 | Chen et al. |
| 2009/0066575 A1 | 3/2009 | Tsutsui |
| 2009/0168843 A1 | 7/2009 | Waters et al. |
| 2009/0168853 A1 | 7/2009 | Gobara |
| 2009/0259707 A1 | 10/2009 | Martin et al. |
| 2009/0278738 A1 | 11/2009 | Gopinath |
| 2009/0309792 A1 | 12/2009 | Hanabusa |
| 2010/0039316 A1 | 2/2010 | Gronemeyer et al. |
| 2010/0040117 A1 | 2/2010 | Lawrow |
| 2010/0254492 A1 | 10/2010 | Chen |
| 2011/0237277 A1 | 9/2011 | Terashima et al. |
| 2011/0254732 A1 | 10/2011 | Martin et al. |
| 2012/0202428 A1* | 8/2012 | Mirbaha ............... H04L 12/185 455/41.2 |
| 2013/0084845 A1 | 4/2013 | Kimura et al. |
| 2013/0177045 A1 | 7/2013 | Terashima |
| 2013/0177046 A1 | 7/2013 | Terashima |
| 2013/0285854 A1 | 10/2013 | Gobara |
| 2014/0071928 A1 | 3/2014 | Papasakellariou et al. |
| 2014/0092764 A1 | 4/2014 | Ogawa |
| 2014/0098788 A1 | 4/2014 | Uemura et al. |
| 2014/0119308 A1 | 5/2014 | Mochida |
| 2015/0206837 A1 | 7/2015 | Gu et al. |
| 2015/0289206 A1 | 10/2015 | Kimura et al. |

FOREIGN PATENT DOCUMENTS

| | | |
|---|---|---|
| JP | 2001-159670 A | 6/2001 |
| JP | 2002-530974 A | 9/2002 |
| JP | 2003-504919 A | 2/2003 |
| JP | 2004-179255 A | 6/2004 |
| JP | 2004-260217 A | 9/2004 |
| JP | 2006-270510 A | 10/2006 |
| JP | 2009-063451 A | 3/2009 |
| JP | 2009-175123 A | 8/2009 |
| JP | 2009-266964 A | 11/2009 |
| JP | 2009-276198 A | 11/2009 |
| JP | 2011-520131 A | 7/2011 |
| JP | 2011-220998 A | 11/2011 |
| JP | 2012-010202 A | 1/2012 |
| JP | 2013-142606 A | 7/2013 |
| JP | 2013-228250 A | 11/2013 |
| JP | 2013-229056 A | 11/2013 |
| JP | 2013-235404 A | 11/2013 |
| WO | WO-00-31659 A1 | 6/2000 |
| WO | WO-01-03294 A1 | 1/2001 |

OTHER PUBLICATIONS

Jae-Chern Yoo et al., "1-D Fast Normalized Cross-Correlation Using Additions", Digital Signal Processing, Academic Press, Orlando, FL, US, vol. 20, No. 5, Sep. 1, 2010, pp. 1482-1493, XP027070377.

Datasheet for CXD2951GA-4 Single Chip GPS LSI, Sony Corporation.

* cited by examiner

INTEGRATED CIRCUIT FOR SATELLITE SIGNAL RECEPTION

CROSS-REFERENCE

This application claims priority to Japanese Patent Application No. 2013-251777, filed Dec. 5, 2013, the entirety of which is hereby incorporated by reference. The entire disclosures of Japanese Patent Application Nos. 2013-229056 filed Nov. 5, 2013 and 2013-235404 filed Nov. 13, 2013 are also expressly incorporated by reference herein.

BACKGROUND

1. Technical Field

The present invention relates to an integrated circuit for satellite signal reception.

2. Related Art

Various receivers for receiving satellite signals for positioning have been developed. One request for such receivers is that a time (TTFF: Time To First Fix) from measurement start to initial measurement is made very short (high speed) even in a so-called weak electric field environment. However, the signal intensity of the satellite signal for positioning is originally weak. Thus, in order to capture and track the satellite signal for positioning in the weak electric field environment, the reception sensitivity needs to be enhanced. One known technique for improving reception sensitivity is to prolong the time for integrating the results of correlation processing.

However, when the integration time is prolonged, the preparation for positioning calculation takes much time, and consequently, the TTFF becomes long. Thus, shortening the TTFF even in the weak electric field environment requires fulfilling two contrary demands.

As a technique for shortening the TTFF, US Patent Application Publication No. 2003/0081660 discloses a correlation process that is performed at a higher speed than a speed of receiving a signal. In this way, the correlation process is virtually parallelly performed.

Another request for the receiver of the satellite signal for positioning is miniaturization. However, the core part of the receiver of the satellite signal for positioning includes one or plural integrated circuits, and is manufactured as a part of the entire apparatus obtained by the user. Accordingly, a problem in miniaturization of the receiver is how to make the integrated circuit as small as possible.

SUMMARY

An advantage of some aspects of the invention is to provide an integrated circuit for satellite signal reception which is small and in which the TTFF is relatively short even when a reception signal intensity is weak.

A first aspect of the invention is directed to an integrated circuit for satellite signal reception including a reception circuit to receive a satellite signal, and a position calculator to calculate a position based on the satellite signal, and has a volume of 9.33 mm$^3$ or less, and a time from measurement start to initial measurement of 120 seconds or less at a signal intensity of −162 dBm or more and −160 dBm or less.

A second aspect of the invention is directed to the integrated circuit for satellite signal reception, wherein the time from measurement start to initial measurement is 60 seconds or less at −160 dBm.

A third aspect of the invention is directed to the integrated circuit for satellite signal reception, which further includes a sample memory and a correlation memory, and a total capacity of the sample memory and the correlation memory is 300.9 Kbytes or less.

A fourth aspect of the invention is directed to the integrated circuit for satellite signal reception, wherein the correlation memory includes 40 or more and 54 or less banks.

According to the first to fourth aspects of the invention, the integrated circuit for satellite signal reception can be provided which is small and in which the TTFF is short even when the reception signal intensity is weak.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, an embodiment of the invention will be described with reference to the drawings. However, of course, the embodiments to which the invention can be applied are not limited to the embodiment described below.

Structure

Figure 1:
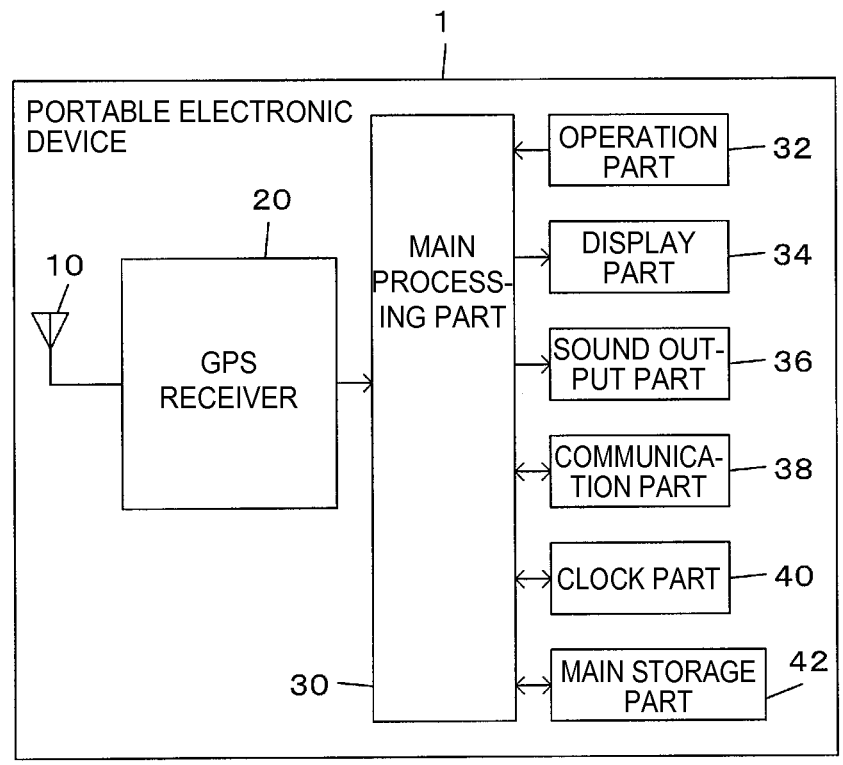
FIG. 1 is a structural view of a portable electronic device.

FIG. 1 is a structural view of a portable electronic device 1 of this embodiment. As shown in FIG. 1, the portable electronic device 1 includes a GPS (Global Positioning System) antenna 10, a GPS receiver 20, a main processing part 30, an operation part 32, a display part 34, a sound output part (speaker) 36, a communication part 38, a clock part 40 and a main storage part 42.

The GPS antenna 10 is an antenna for receiving RF (Radio Frequency) signals including a GPS satellite signal transmitted from a GPS satellite. The GPS satellite signal is a signal which is subjected to spectrum diffusion modulation by a C/A (Coarse and Acquisition) code which is a diffusion code, and is superimposed on a carrier wave of 1.57542 GHz. The C/A code is a pseudo random noise code with a repetition period of 1 millisecond using a code length of 1023 chips as one PN frame, and is different for each GPS satellite.

The GPS receiver 20 calculates the position and speed of the GPS receiver 20 based on a navigation message such as orbit information (ephemeris, almanac) of the GPS satellite superimposed on and carried by the GPS satellite signal received by the GPS antenna 10.

The main processing part 30 is preferably a processor such as a CPU (Central Processing Unit) or a DSP (Digital Signal Processor), and comprehensively controls respective parts of the portable electronic device 1 in accordance with various programs, such as a system program stored in the main storage part 42.

The operation part 32 is an input device constructed of a touch panel, a button switch or the like, and outputs an operation signal corresponding to a user's operation to the main processing part 30. The display part 34 is a display device constructed of an LCD (Liquid Crystal Display) or the like, and performs various displays based on a display signal from the main processing part 30. The sound output part 36 is a sound output device constructed of a speaker or the like, and performs various sound outputs based on a sound signal from the main processing part 30. The communication part 38 is a communication device of wireless LAN (Local Area Network), Bluetooth (registered trademark) or the like, and performs communication with an external device. The clock part 40 is an inner clock constructed of an oscillation circuit including a crystal oscillator or the like, and measures the present time, an elapsed time from a specified timing and the like.

The main storage part 42 is a storage device constructed of a ROM (Read Only Memory), a RAM (Random. Access Memory) or the like, and stores the system program in accordance with which the main processing part 30 comprehensively controls the respective parts of the portable electronic device 1, programs and data for realizing various functions of the portable electronic device 1. Further, the main storage part 42 is used as a work area of the main processing part 30, and temporarily stores calculation results of the main processing part 30 and operation data from the operation part 32.

Figure 2:
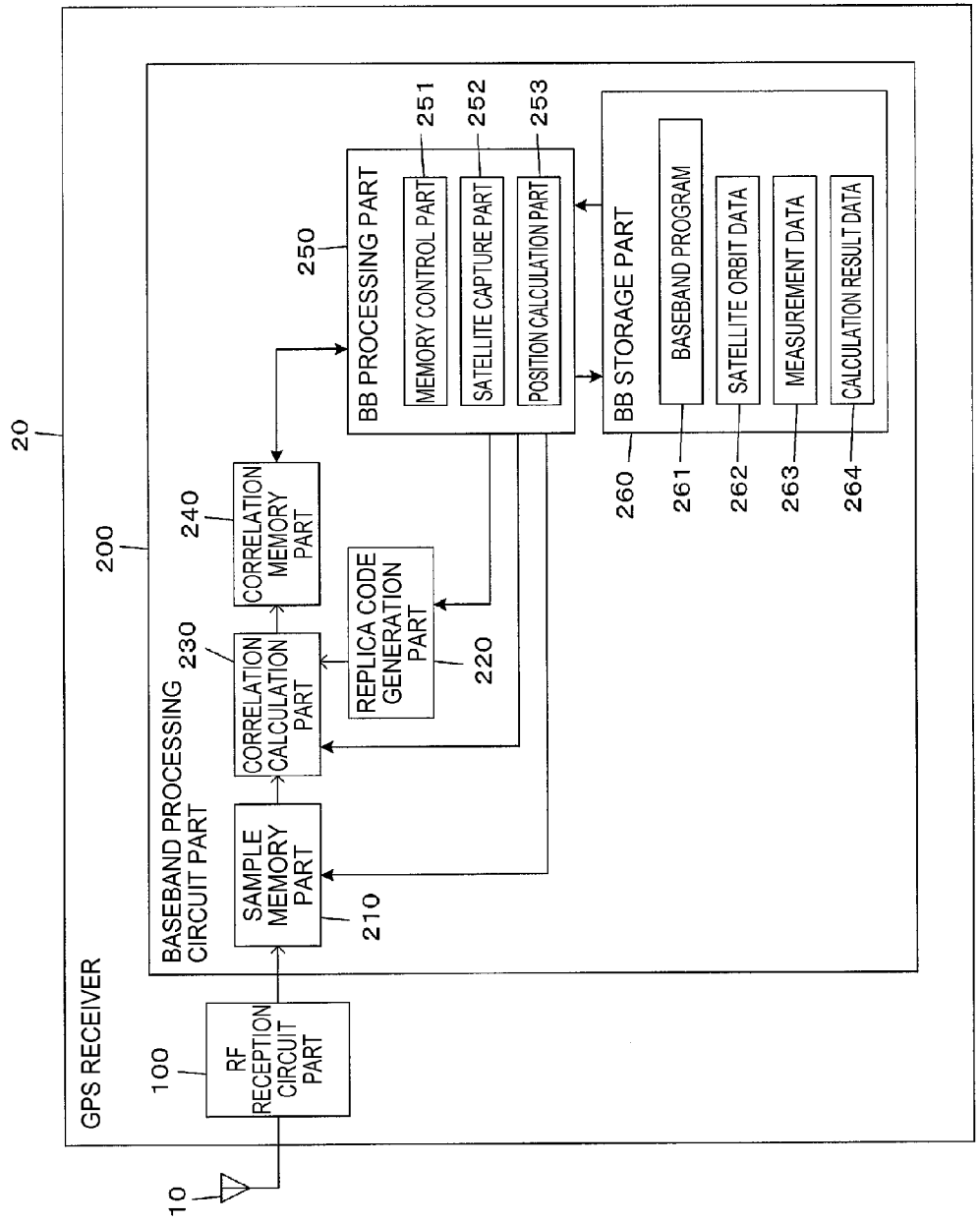
FIG. 2 is a structural view of a GPS receiver.

FIG. 2 is a structural view of the GPS receiver 20. As shown in FIG. 2, the GPS receiver 20 includes an RF reception circuit part 100 and a baseband processing circuit part 200. The GPS receiver 20 is an integrated circuit (IC) for satellite signal reception constructed in one chip, and the chip size is 3.65 mm×3.65 mm×0.7 mm. That is, the volume is 9.32575 mm$^3$ and is 9.33 mm$^3$ or less. Incidentally, the chip size can be made 3.5 mm×3.5 mm×0.5 mm (volume is 6.125 mm$^3$) or more and 3.65 mm×3.65 mm×0.7 mm or less. Accordingly, the volume can be made 6.12 mm$^3$ or more and 9.33 mm$^3$ or less.

The RF reception circuit part 100 down-converts the RF signal received by the GPS antenna 10 to an IF (Intermediate Frequency) signal. Further, after performing amplification and the like, the RF reception circuit part converts the signal into a digital signal by sampling the signal at specified sample time intervals and outputs the digital signal. In this embodiment, the RF reception circuit part 100 corresponds to a reception circuit part to receive a satellite signal.

The baseband processing circuit part 200 captures and tracks the GPS satellite signal by using the data of the reception signal output from the RF reception circuit part 100, and calculates the position of the GPS receiver 20 (portable electronic device 1) and a clock error by using the time information and satellite orbit information extracted from the captured GPS satellite signal.

The baseband processing circuit part 200 includes a sample memory part 210, a replica code generation part 220, a correlation calculation part 230, a correlation memory part 240, a BB (Base Band) processing part 250 and a BB storage part 260.

Figure 3:
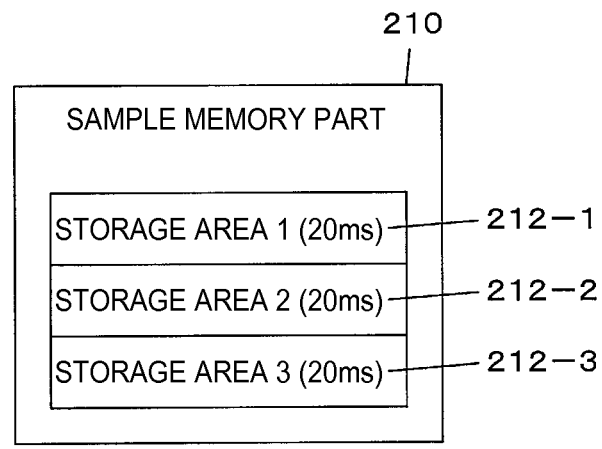
FIG. 3 is a schematic structural view of a sample memory part.

The sample memory part 210 stores the data of the reception signal output from the RF reception circuit part 100. FIG. 3 is a schematic structural view of the sample memory part 210. The sample memory part 210 includes three storage areas 212 (212-1 to 212-3) in each of which the data of the reception signal of 20 milliseconds can be stored.

The data of the reception signal output from the RF reception circuit part 100 is stored (written) in the sequence of, for example, the storage areas 212-1, 212-2 and 212-3 in units of 20 milliseconds. At this time, data stored in the two storage areas 212 other than the storage area 212 in which the data is stored are read out and are used for correlation calculation. That is, the one storage area 212 in which the data is stored (written) and the two storage areas 212 from which the data are read out are switched every 20 milliseconds. The capacity of the sample memory part 210, which is the total of the three storage areas 212-1 to 212-3, is 61.9 Kbytes.

The replica code generation part 220 generates a replica code of the C/A code. Specifically, the replica code of the PRN (Pseudo Random Noise) number specified by the BB processing part 250 is generated with a specified phase shift amount.

The correlation calculation part 230 performs correlation calculations between the data of the reception signal stored in the sample memory part 210 and the replica code generated by the replica code generation part 220.

Figure 4:
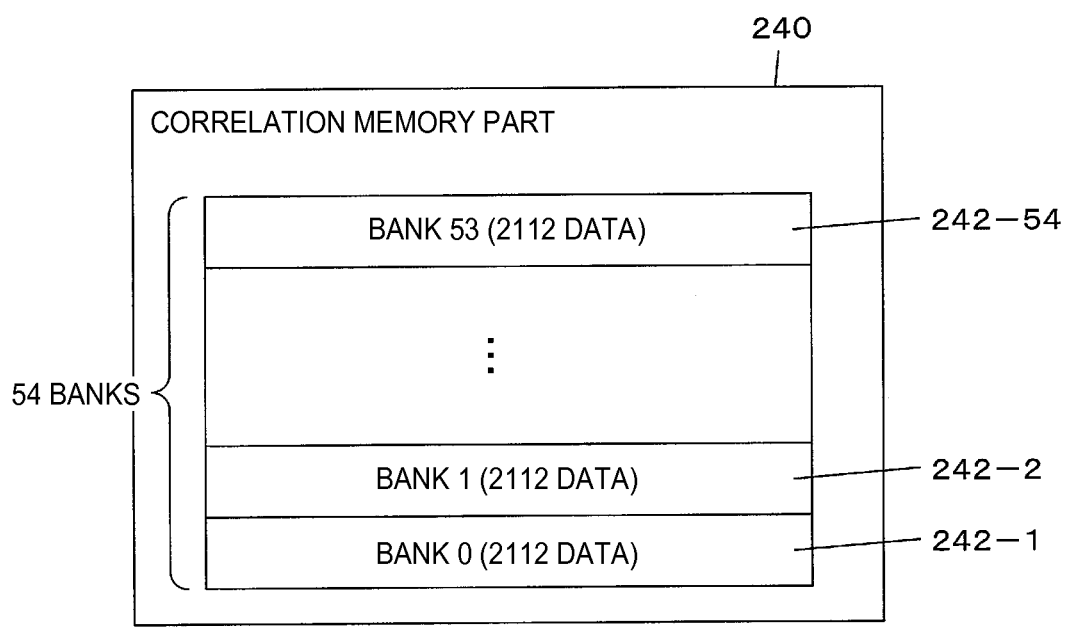
FIG. 4 is a schematic structural view of a correlation memory part.

The correlation memory part 240 stores an integration result of the correlation calculation of the correlation calculation part 230. FIG. 4 is a schematic structural view of the correlation memory part 240. As shown in FIG. 4, the correlation memory part 240 includes 54 banks 242 (242-1 to 242-54) each capable of storing 2112 samples of data of the reception signal.

The correlation calculation between the data of the reception signal and the replica code is performed while the frequency and phase of the replica code are respectively shifted. The so-called frequency search (search in the frequency direction) and the phase search (search in the phase direction) are performed. For example, even when the correlation calculation is performed for one frequency, the correlation calculation is performed by the number of different phases (in other words, the correlation calculation is performed the number of times the replica code is phase-shifted). This is performed for all GPS satellites which are capture objects. Thus, when the correlation calculation is performed, the way of assigning the banks 242 can become a problem. In this embodiment, when the correlation calculation relates to one frequency relating to one GPS satellite, and when the correlation calculation is performed for all phases, one bank 242 is assigned.

A more detailed description will now be made. In this embodiment, in the RF reception circuit part 100, 2112 samplings are performed for the reception signal in 1 millisecond corresponding to the code length (1023 chips) of the C/A code. That is, 2112 samples of data of the reception signal are obtained for the reception signal of 1 millisecond. The phase shift amount of the replica code is n times (n is an integer of 0 or more and 2111 or less) the sampling interval. Thus, one bank 242 can store 2112 samples of data of the reception signal. The number of samples is the maximum of the number (point) of phases by which the correlation calculation is performed. For example, a correlation calculation result obtained when the phase shift amount of the replica code is 0 times the sampling interval (that is, when the phase is not shifted) is stored as the first data of a certain one bank 242. A correlation calculation result obtained when the shift amount of the replica code is 1 times the sampling interval is stored as the second data thereof, and so on. While the integration is performed, the correlation calculation result stored in each of the banks 242 is accumulated until reset.

The capacity of the correlation memory part, which is the total of the 54 banks, is 239.0 Kbytes. Accordingly, the total of the capacity of the correlation memory part 240 and the sample memory part 210 is 300.9 Kbytes.

Returning now to FIG. 2, the BB processing part 250 is preferably a processor such as a CPU or a DSP, and comprehensively controls the respective parts of the baseband processing circuit part 200. The BB processing part 250 includes a memory control part 251, a satellite capture part 252 and a position calculation part 253.

The memory control part 251 controls storage and readout of data to and from the sample memory part 210. Specifically, the control is performed such that among the three storage areas 212, the one storage area 212 in which the data of the reception signal input from the RF reception circuit part 100 is stored (written) and the two storage areas 212 from which the data to be input to the correlation calculation part 230 are read out are repeatedly switched in a specified sequence.

The satellite capture part 252 uses the data of the reception signal read out from the sample memory part 210, and captures the GPS satellite. Specifically, first, the selection of the GPS satellite as a capture object and the setting of the frequency search range are performed. Next, combinations of the GPS satellite to be captured and the frequency are generated, and the generated combinations are respectively assigned to the respective banks 242 of the correlation memory part 240.

With respect to each of the combinations of the GPS satellites and the frequencies, the correlation calculation part 230 performs correlation calculations between the data read out from the sample memory part 210 and the corresponding replica code, and the result (correlation value) of the correlation calculation is stored in the assigned bank 242 of the correlation memory part 240. Further, at this time, the PRN number of the GPS satellite to be captured and the phase shift amount are specified to cause the replica code generation part 220 to generate the corresponding replica code.

When a peak appears in one of the correlation calculation results stored in the bank 242, a determination is made that the GPS satellite of the capture object is captured. When the satellite can not be captured, the satellite capture part 252 performs a process such that the capture time is prolonged, the search frequency is changed and the correlation calculation is again performed, or a determination is made that the GPS satellite can not be captured and the correlation calculation is performed on a GPS satellite of another capture object. Although the reception sensitivity can be improved by prolonging the integration time, the capture time and the TTFF (Time To First Fix) also become long.

The position calculation part 253 performs a position calculation process using the acquired satellite orbit data and measurement data with respect to each of the GPS satellites captured by the satellite capture part 252, and calculates the position of the GPS receiver 20 and the clock error (clock bias). As the position calculation process, a known method such as, for example, a least squares method or a Kalman filter can be applied. In this embodiment, the position calculation part 253 corresponds to a position calculation part to calculate a position based on a satellite signal.

Satellite orbit data 262 is data such as almanac or ephemeris of each GPS satellite, and can be acquired by decoding the received GPS satellite signal. Measurement data 263 is data such as the reception frequency of the received GPS satellite signal, code phase or Doppler frequency, and is acquired based on the correlation calculation result on the replica code. Further, position data and clock error calculated by the position calculation part 253 are accumulated and stored as calculation result data 264.

The BB storage part 260 is preferably a storage device such as a ROM or a RAM, and stores a system program (a baseband program 261, etc.) by which the BB processing part 250 comprehensively controls the baseband processing circuit part 200, programs for realizing various functions and data. Besides, the BB storage part 260 is used as a work area of the BB processing part 250, and the calculation result or the like of the BB processing part 250 is temporarily stored. In this embodiment, the BB storage part 260 stores the baseband program 261, the satellite orbit data 262, the measurement data 263 and the calculation result data 264.

Experimental Results

Experimental results on the GPS receiver in this embodiment will now be described. As experimental object GPS receivers, three kinds of integrated circuits for satellite signal reception, which were different in the number of banks of the correlation memory part 240, were prepared. Specifically, three kinds of circuits, that is, an A circuit in which the number of banks of the correlation memory part 240 is 54 and which is the GPS receiver of the embodiment, and a B circuit in which the number of banks of the correlation memory part 240 is 72 and a C circuit in which the number of banks is 20, which are for comparison of performance, were prepared.

Incidentally, the B circuit and the C circuit are not one chip. The B circuit does not include the function parts, such as the position calculation part (realized by the processor), and the C circuit does not include the RF reception circuit part. When the B circuit and the C circuit are assumed to be packages including all functions equivalent to those of the A circuit and the sizes thereof were estimated, the volume of the B circuit (package) was 9.84 mm$^3$, and the volume of the C circuit (package) was 34.98 mm$^3$.

(A) Capture Time

Figure 5:
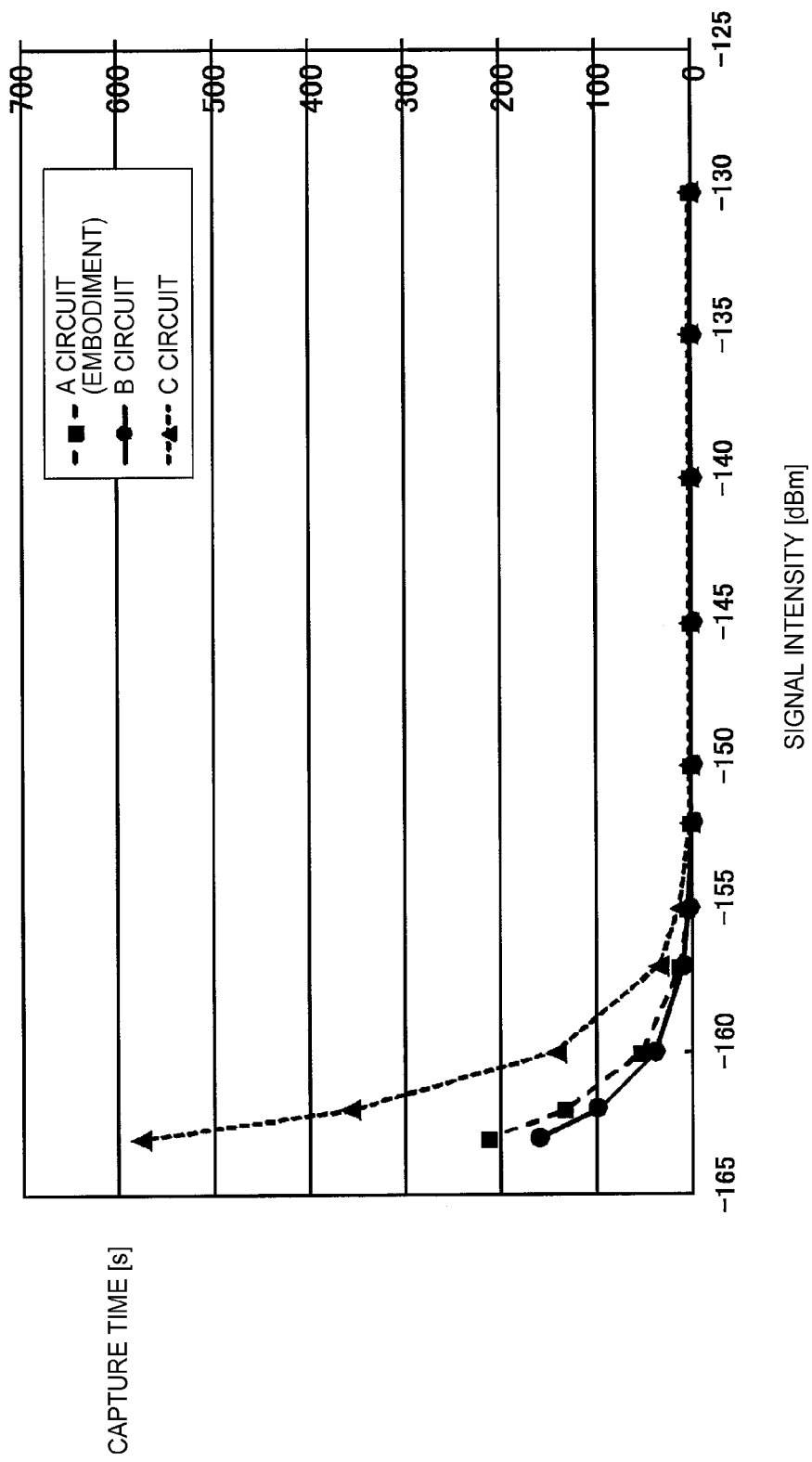
FIG. 5 is a graph of experimental results showing a relation between signal intensity and capture time.

FIG. 5 is a graph showing a relation between signal intensity of a GPS satellite signal and capture time. In FIG. 5, the horizontal axis indicates the signal intensity (unit is dBm), and the vertical axis indicates the capture time (unit is seconds). This experiment was performed using a simulator to generate and transmit a signal simulating the GPS satellite signal. The same applies to the experiment of FIG. 6. It would be apparent for a skilled person in the art that an equivalent result can also be obtained in the real environment.

In this embodiment, in each of plural cases in which the signal intensities of GPS satellite signals were different from each other, the time (capture time) required for capturing all GPS satellite signals of 8 satellites was calculated. The number 8 is the number of GPS satellites which can exist above the GPS receiver.

According to the experimental results, it is understood that in any of the A circuit, the B circuit and the C circuit, as the signal intensity becomes low, the capture time becomes long. Specifically, when the signal intensity becomes −155 dBm or less, the capture time abruptly becomes long. It is presumed that this is because as the signal intensity becomes low, the integration time becomes long.

Besides, at the same signal intensity, as compared with the C circuit, the capture time of the A circuit of the embodiment is considerably short. Further, as compared with the B circuit, although the capture time of the A circuit of the embodiment is slightly longer, the capture performance is substantially the same.

This is because the GPS satellites to be searched and the frequency range are grasped as a sufficiently narrow range. For example, when the frequency search range is made a range of ±100 Hz around 1.57542 GHz which is the carrier frequency of the GPS satellite signal, and searching is performed at intervals of 50 Hz, five frequencies of "−100, −50, 0, +50, +100" of the carrier frequency are searched with respect to one GPS satellite. That is, the five banks 242 are used for one GPS satellite. When 8 satellites are simultaneously searched, 40 banks are used. That is, the A circuit of the embodiment in which the correlation memory part 240 includes 54 banks, and the B circuit including 72 banks can simultaneously search the 8 satellites. However, the C circuit in which the number of banks is 20 can simultaneously search only 4 satellites. Thus, as compared with the A circuit and the B circuit, the C circuit requires about twice the capture time. Incidentally, the capacity of the correlation memory part in the case of 40 banks is 177.0 Kbytes.

(B) TTFF

Figure 6:
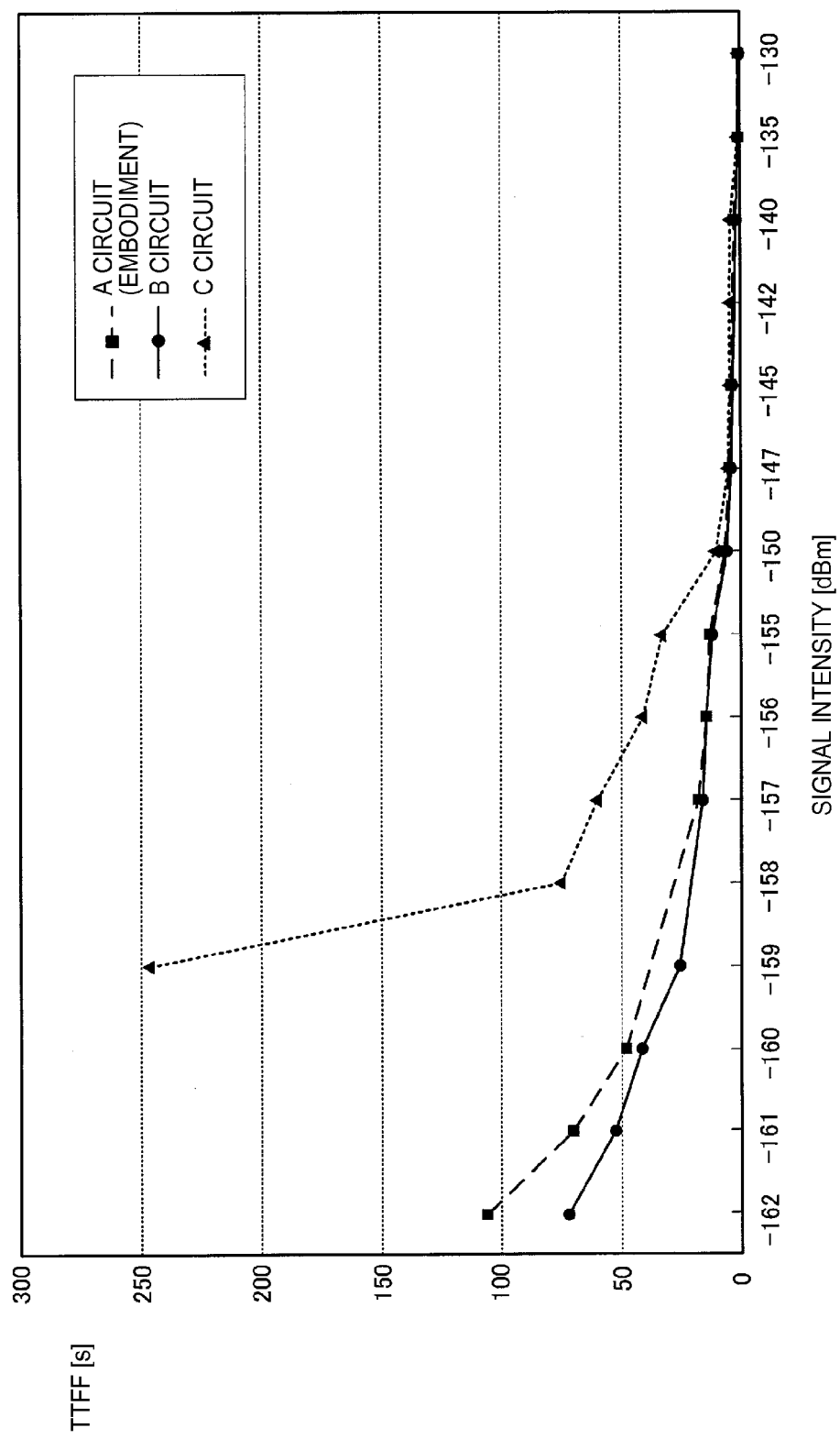
FIG. 6 is a graph of experimental results showing a relation between signal intensity and TTFF.

FIG. 6 is a graph showing a relation between the signal intensity of the GPS satellite signal and the TTFF. In FIG. 6, the horizontal axis indicates the signal intensity (unit is dBm), and the vertical axis indicates the TTFF (unit is seconds). Incidentally, as stated above, the TTFF is the time from the measurement start to the initial measurement.

In this experiment, plural measurements (position calculations) were performed with respect to each of plural different signal intensities, and the average value of the TTFF of each of the signal intensities was calculated. Besides, a fix rate (success rate of measurement) at each of the signal intensities was also calculated (not shown). The fix rate is the ratio of the number of successful measurements to the number of total measurements performed. Successful measurements means that the position is calculated and an error between the calculated position and the true position is a specified distance or less.

According to the experimental results, it is understood that in any of the A, the B and the C circuits, as the signal intensity becomes low, the TTFF becomes long. Further, when the A circuit of the embodiment is compared with the C circuit, the TTFF of the A circuit is sufficiently short as compared with the C circuit. Further, when the A circuit is compared with the B circuit, although the TTFF of the A circuit is slightly longer than the B circuit, the A circuit has almost the same measurement performance. This is because, as described above, although both the A circuit and the B circuit can simultaneously search 8 satellites, the C circuit can simultaneously search only 4 satellites.

When attention is given to the fix rate, the lower limit of the signal intensity where the fix rate became 100% was −161 dBm in the A circuit of the embodiment, −162 dBm in the B circuit, and −158 dBm in the C circuit. That is, the A circuit of the embodiment is more excellent in reception in the weak electric field environment than the C circuit, and has almost equivalent performance to the B circuit. In particular, in the range in which the fix rate is 100% and the signal intensity is −160 dBm, which is a weak electric field environment and is a measurable range, the TTFF of the A circuit of the embodiment is 100 seconds or less, and particularly 60 seconds or less. Further, when the signal intensity is −162 dBm, the TTFF is 120 seconds or less.

From these experimental results, as compared with the B circuit, although the number of banks of the correlation memory part 240 is small in the A circuit of the embodiment, the A circuit has substantially the same performance (capture performance, position measurement performance, measurable signal intensity, etc.) as the B circuit. The number of banks of the correlation memory part 240 greatly influences the volume (chip size) of the GPS receiver 20 which is an IC. That is, the GPS receiver 20 (A circuit) of the embodiment has substantially the same performance as the GPS receiver (B circuit) but realizes a volume reduction (reduced chip size).

Operation and Effect

According to the embodiment, the GPS receiver 20 can be realized in which even if the reception signal intensity is low, measurement is possible, and further, the TTFF is short and miniaturization is realized.

Modified Examples

Incidentally, embodiments to which the invention can be applied are not limited to the above embodiment, and can be appropriately modified within a scope not departing from the gist of the invention.

(A) Satellite Measurement System

In the above embodiment, although the description is made while using GPS as the example of the satellite position measuring system, another satellite position measuring system such as WAAS (Wide Area Augmentation System), QZSS (Quasi Zenith Satellite System), GLONASS (GLObal NAvigation Satellite System), GALILEO or BeiDou (BeiDou Navigation Satellite System) may be used.

(B) Portable Electronic Device

As the portable electronic device 1 to which the invention can be applied, there are various electronic devices such as, for example, a runner's watch, a portable navigation device, a personal computer, a PDA (Personal Digital Assistant), a cellular phone and a wrist watch. Since the GPS receiver 20 of the embodiment is small, it is particularly suitable for the runner's watch or the wrist watch which is strongly requested to be miniaturized.

(C) Sample Memory Part

In the above embodiment, although the description is made of the case where the sample memory part 210 includes the three storage areas 212-1 to 212-3, the number of the storage areas 212 may be two. In this case, the capacity of the sample memory part is 41.3 Kbytes. Accordingly, the capacity of the sample memory part can be made 41.3 to 61.9 Kbytes, and the total of the capacity of the sample memory part and the correlation memory part 240 can be made 218.3 to 300.8 Kbytes.

What is claimed is:

1. An integrated circuit for satellite signal reception, comprising:

a reception circuit that receives a satellite signal from a satellite for positioning and generates a digital signal based on the satellite signal; and a baseband processing circuit that calculates a position based on the digital signal generated by the reception circuit, wherein each of the reception circuit and the baseband processing circuit are located on the integrated circuit, wherein the baseband processing circuit comprises, on the integrated circuit with the reception circuit, a sample memory part that stores data corresponding to the digital signal, a replica code generation part that generates replica code, a correlation calculation part that performs correlation calculation between the data stored in the sample memory part and the replica code, a correlation memory part that stores a result of the correlation calculation, and a baseband processing part, wherein the baseband processing part comprises a satellite capture part that captures a position of the satellite based on the result of the correlation calculation, and a position calculation part that calculates the position based on the data acquired from the satellite for the positioning captured by the satellite capture part, wherein the integrated circuit has a volume of 9.33 mm$^3$ or less, and wherein, when a signal intensity of the satellite signal is −162 dBm or more and −160 dBm or less, a time to first fix (TIFF) of the integrated circuit is 120 seconds or less.

2. The integrated circuit for satellite signal reception according to claim 1, wherein, when the signal intensity of the satellite signal is −160 dBm, the TIFF is 60 seconds or less.

3. The integrated circuit for satellite signal reception according to claim 1,
wherein
a total capacity of the sample memory and the correlation memory is 300.9 Kbytes or less.

4. The integrated circuit for satellite signal reception according to claim 3, wherein the correlation memory part includes 40 or more but 54 or less banks.

* * * * *